United States Patent [19]
Brown et al.

[11] 4,114,738
[45] Sep. 19, 1978

[54] BRAKE AND CREEPER CONTROL SYSTEM

[75] Inventors: Vaikai K. Brown, Thompson; Richard N. Fatur, Eastlake, both of Ohio

[73] Assignee: Towmotor Corporation, Mentor, Ohio

[21] Appl. No.: 760,065

[22] Filed: Jan. 17, 1977

[51] Int. Cl.² .............................................. B60K 41/24
[52] U.S. Cl. .................................. 192/4 A; 192/13 R; 74/474; 74/480 R
[58] Field of Search .................... 192/4 A, 4 C, 13 R; 74/474, 480 R, 480 B

[56] References Cited

U.S. PATENT DOCUMENTS

| | | | |
|---|---|---|---|
| 2,037,321 | 4/1936 | French, Jr. | 192/13 R |
| 2,104,455 | 1/1938 | Ford | 192/13 R X |
| 2,132,006 | 10/1938 | Rourke | 192/13 R |
| 3,292,752 | 12/1966 | Schuster et al. | 192/13 |
| 3,709,344 | 1/1973 | Sieren | 192/13 R X |

*Primary Examiner*—James F. Coan
*Attorney, Agent, or Firm*—Phillips, Moore, Weissenberger, Lempio & Majestic

[57] ABSTRACT

A control arrangement for a vehicle includes a brake control for applying the brakes of the vehicle and a combined brake and transmission control for controlling the transmission over a first range of movement and thereafter applying the brakes of the vehicle over a second range of movement. The arrangement includes a brake actuating linkage and first and second pedals mounted for pivotal movement about first and second axes, respectively. Lost motion linkage means including a rotatable shaft mounted for pivotal movement about a third axis radially offset from said first and second axes and extending between said first and second pedals is further provided for compactness of design.

10 Claims, 6 Drawing Figures

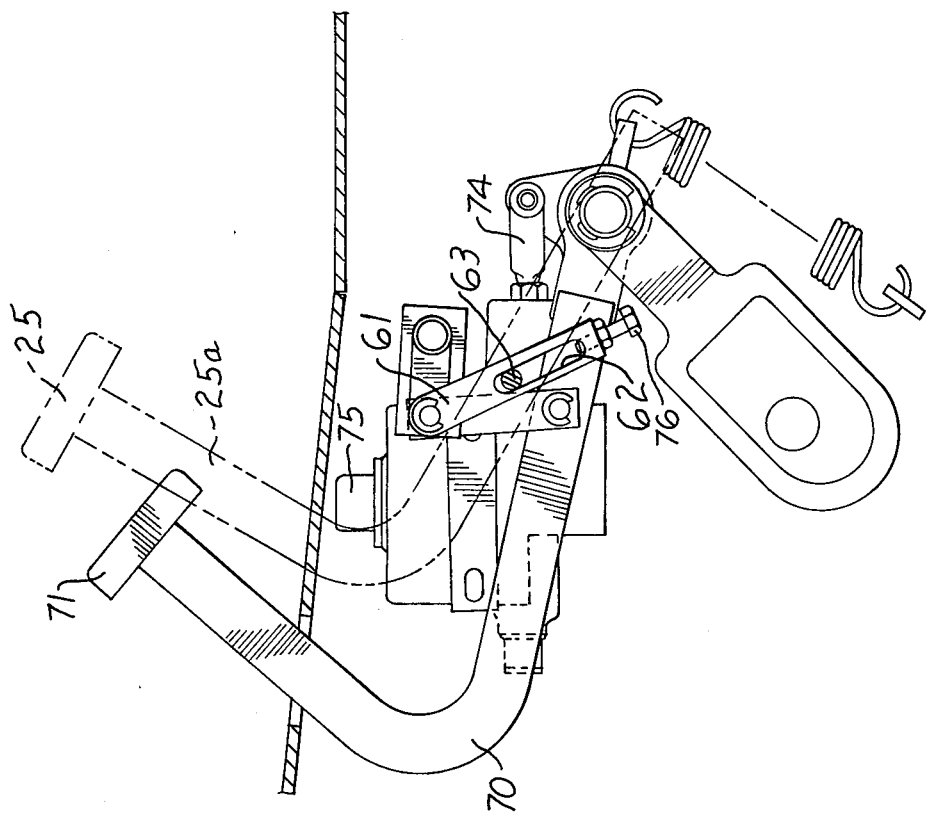
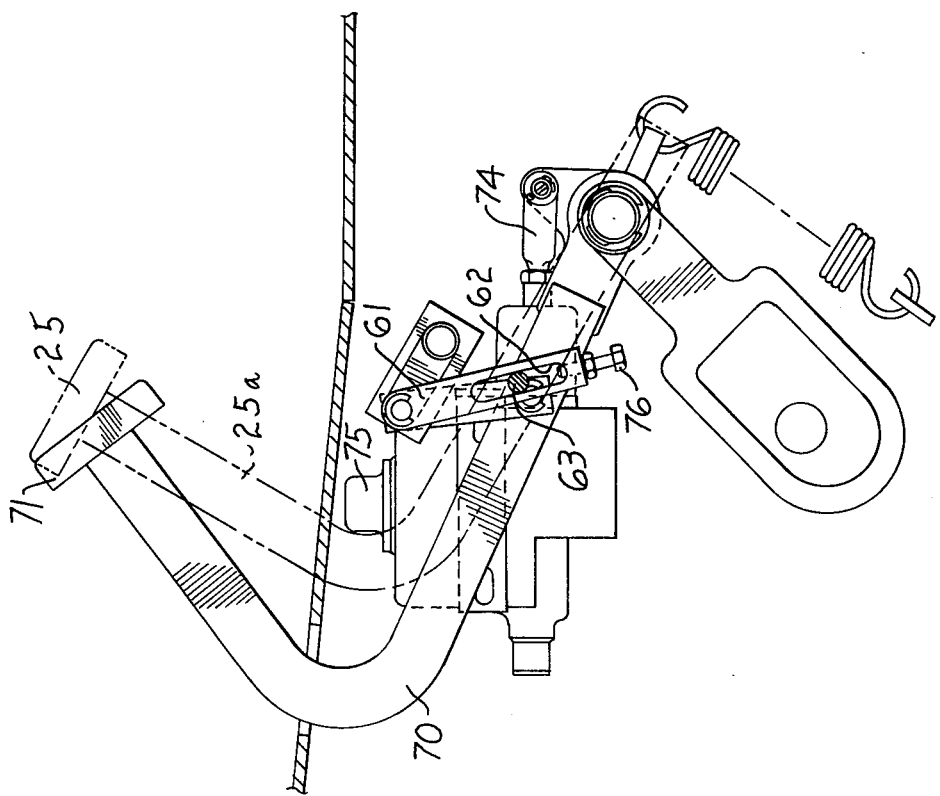

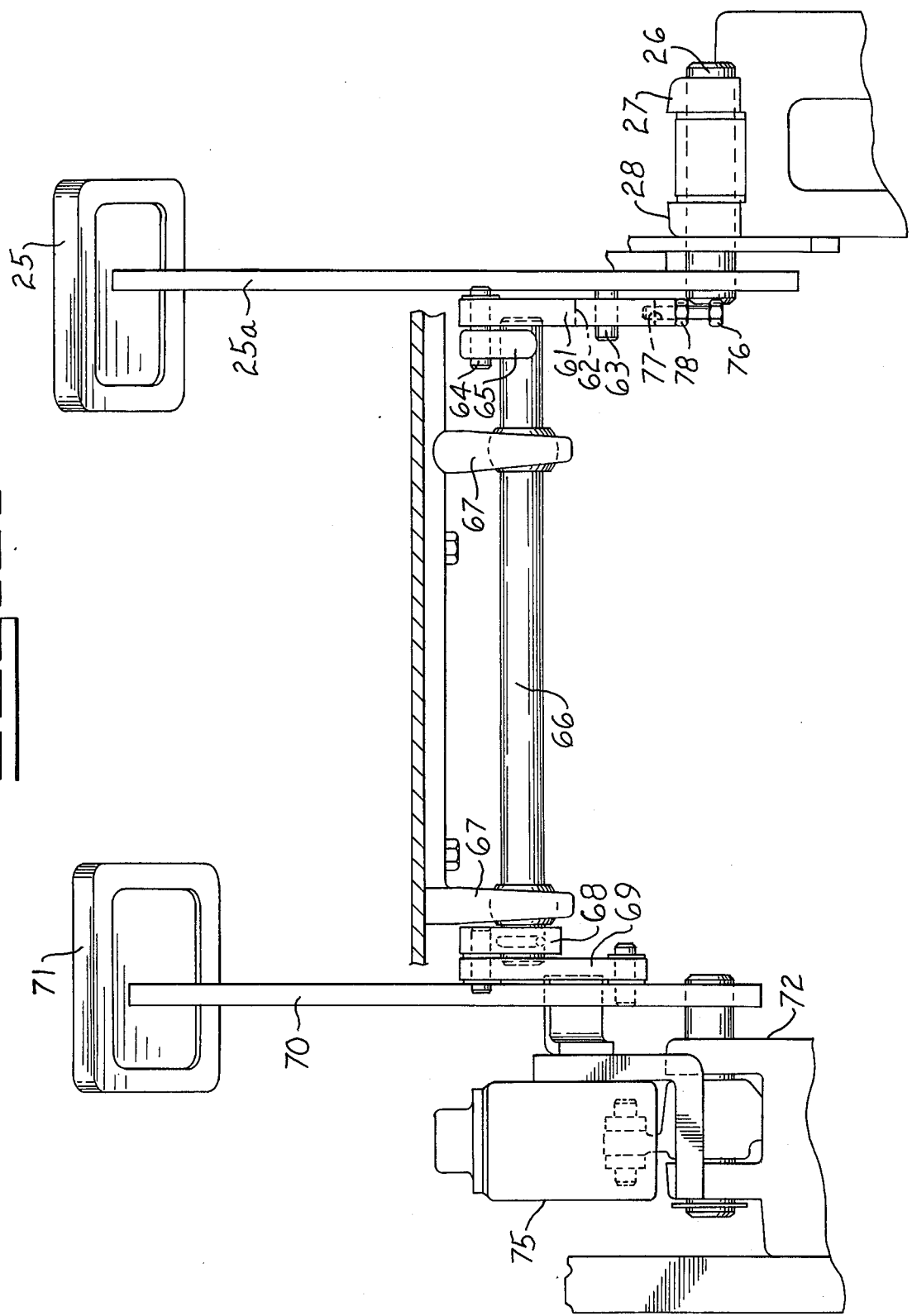

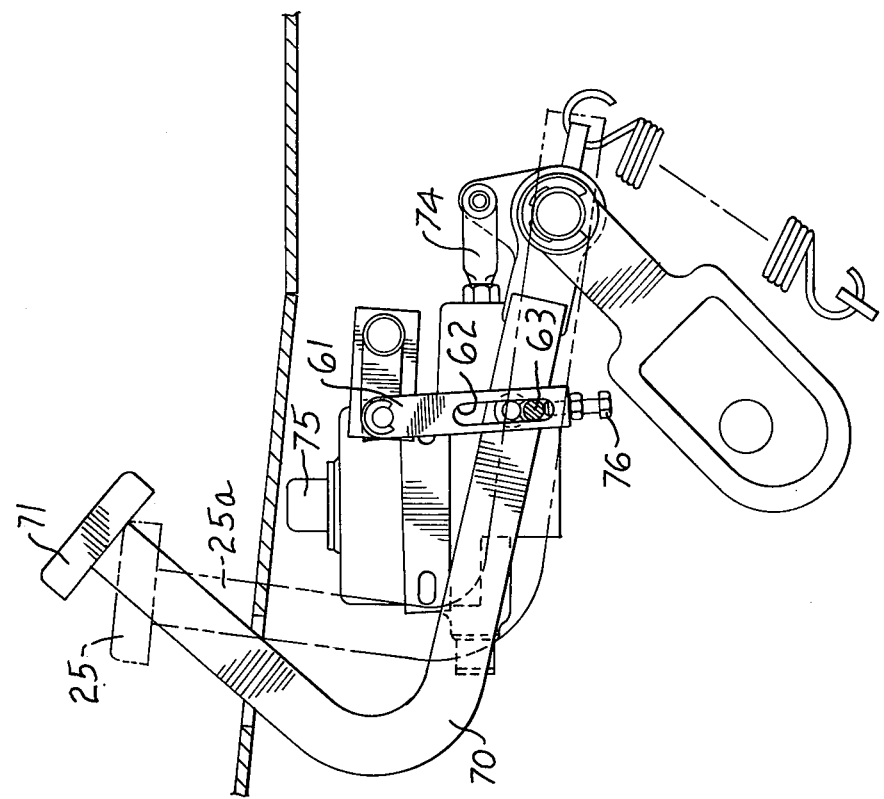
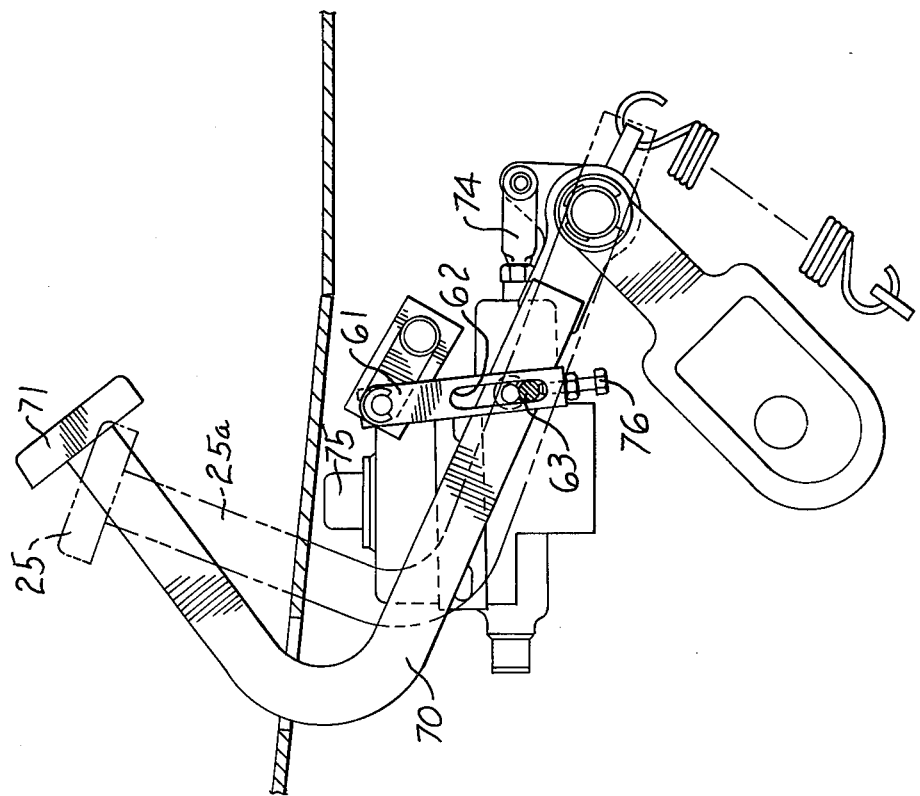

BRAKE AND CREEPER CONTROL SYSTEM

BACKGROUND OF THE INVENTION

The present invention relates to control systems and pertains particularly to combined brake and creeper control systems for industrial vehicles.

Many industrial trucks, such as lift trucks and the like, are powered by gasoline engines and include a hydrostatic transmission for transmitting power from the engine of the vehicle to the driving wheels thereof. The hydrostatic transmission employs a hydrostatic motor and pump and is controlled by varying the displacement of one or the other, or both, of the motor and pump to achieve forward and reverse of the vehicle and to control speed thereof.

Because of the limit on the number of manual control members that an operator can successfully manipulate for control of the vehicle, many functions of the vehicle are combined to single manual control members. For example, the drive and transmission control are normally combined in a single element. A separate brake control pedal and a separate creeper control pedal are also normally provided. The creeper control functions to override the normal transmission control valve to permit the engine R.P.M. to be raised for fast lift of a load while the vehicle is traveling slowly or not at all. Such manipulation, however, is difficult if not impossible to accomplish on a hill or other slope because the transmission must be disabled and the brakes applied simultaneously, or to secure the vehicle while loading or unloading and still maintain maximum engine speed for lifting.

SUMMARY AND OBJECTS OF THE INVENTION

It is therefore a primary object of the present invention to provide a control arrangement for industrial vehicles and the like, that overcomes the above problems of the prior art.

Another object of the present invention is to provide a vehicle control arrangement that is simple and effective to control both the transmission and the brakes of a vehicle by means of a single operator control element.

A further object of the present invention is to provide a control arrangement for a vehicle having a first control pedal for operating the brakes of the vehicle and a second control pedal for controllably neutralizing the transmission of the vehicle over a first range of movement and for thereafter applying the brakes of the vehicle.

In accordance with the primary aspect of the present invention, a control arrangement for a vehicle includes a brake control means for applying the brakes of the vehicle and combined brake and transmission control means for controlling the transmission over a first range of movement and thereafter applying the brakes of the vehicle over a second range of movement. The arrangement includes a brake actuating linkage and first and second pedals mounted for pivotal movement about first and second axes, respectively. Lost motion linkage means including a rotatable shaft mounted for pivotal movement about a third axis radially offset from said first and second axes and extending between said first and second pedals is further provided for compactness of design.

BRIEF DESCRIPTION OF THE DRAWINGS

The above and other objects and advantages of the present invention will become apparent from the following description when read in conjunction with the accompanying drawings, wherein:

FIG. 2 is a side elevation view of the control pedals of the system of FIG. 1 in the fully raised position;

FIG. 3 is a front sectional view of a portion of the system of FIG. 1 showing the control pedals in elevation a neutral position;

FIG. 4 is a view like FIG. 2 showing the brake pedal in the braking position; and, FIG. 5 is a side elevational view like FIG. 2 showing the creeper pedal in a partially depressed position prior to breaking.

FIG. 6 is a view like FIG. 5 showing the creeper pedal in the fully depressed position.

DETAILED DESCRIPTION

Figure 1:
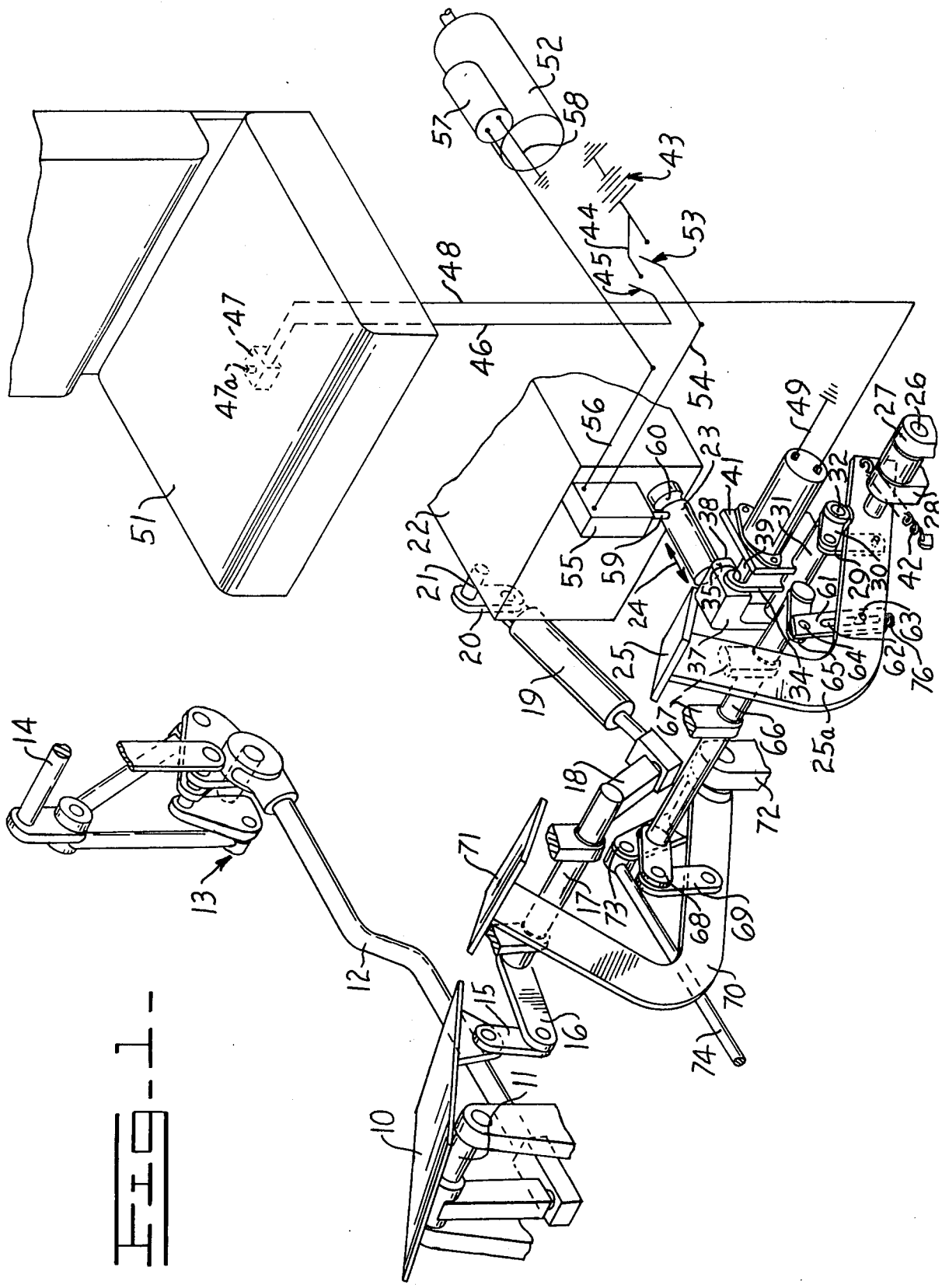
FIG. 1 is a perspective view of a control system embodying the present invention.

Referring now to FIG. 1 of the drawing, a control system for a hydrostatically equipped lift truck or the like is disclosed. Only that part of the lift truck and the control system necessary for an understanding of the present invention is specifically illustrated. Examples of hydrostatic transmissions for use in such lift trucks or the like are illustrated for example in U.S. Pat. Nos. 3,451,218, issued June 24, 1969 to Grant and 3,486,335, issued Dec. 30, 1969 to Kern et al, both of which are assigned to the assignee hereof, and incorporated herein by reference. The system, as illustrated in FIG. 1, comprises a combined throttle and transmission control including a foot pedal 10 mounted for rocking movement about a shaft 11 and including a link 12 connecting the pedal to a multidirectional input single directional output mechanism indicated generally by the numeral 13 for converting and applying the multidirectional movement of the pedal 10 to a unidirectional output at shaft 14 which is connected for controlling a throttle or governor control of the vehicle (not shown). This control linkage arrangement is covered in more detail in copending application Ser. No. 760,068, filed on Jan. 17, 1977, and assigned to the assignee hereof.

Transmission control linkage means are also connected to move with the pedal 10 and include a link 15 pivotally connected at one end of the pedal 10 and at the other end to an arm 16 of a shaft 17 having a second arm 18 on the opposite end thereof which is connected by a lost motion linkage arrangement 19 to an arm 20 which in turn is connected such as by a shaft 21 to the swash plate control means within the hydrostatic transmission 22. This control linkage connects the pedal 10 to move the control shaft 21 in either forward or reverse direction to thereby move the hydrostatic transmission from its neutral position to either the forward or reverse position. This is normally accomplished simply by moving the swash plate of the pump or motor of the hydrostatic transmission from a neutral or nondisplacement position to a displacement position. Thus, when the pedal 10 is tilted in what would be a forward position, the transmission is likewise shifted to its reverse position. The degree of shifting of the transmission is coordinated through the linkage means with the degree of movement of the accelerator of the engine of the vehicle to thereby controllably advance the throttle of the engine simultaneously with advancing the displacement of the transmission. When the pedal 10 is returned to its neutral position, the throttle control is returned to an idle position and the transmission control is returned to the neutral position. Thus, any time the vehicle throttle is advanced the vehicle translation system is also advanced so that the vehicle moves over the ground or other supporting surface.

Creeper control means is provided to allow the engine of the vehicle to be revved to a high R.P.M. while the vehicle is either stopped or traveling at a slow rate of speed in order to obtain a fast lift of a load or the like. The creeper control essentially overrides the transmission control valve control signal for decreasing the displacement of the hydrostatic transmission, thereby controlling the rate of travel of the vehicle. The creeper control means comprises a vent valve control member 23 connected to the vent valve within the transmission 22 and slidably mounted for reciprocating movement as indicated by arrow 24. The vent valve control member 23 is normally biased outwardly, and when permitted will automatically move outwardly to automatically vent or modify the transmission control means to change the angle of the swash plate.

Manual operator control means in the form of a foot pedal 25 is mounted for pivotal movement on a shaft 26 which is mounted in suitable brackets 27 and 28 and secured such as to the floor boards or frame of the vehicle (not shown). A link member 29 is pivotally connected at one end to the foot pedal and at the opposite end to an arm 30 on a tubular shaft 31 rotatably mounted on a cylindrical shaft 32 and retained thereon in a suitable manner. A second arm 34 extends upwardly from the tubular shaft 31 and includes an aperture or bore 35 therethrough which is adapted to register with a similar bore or aperture 36 in a third arm 37 mounted on the cylindrical shaft 32. The arm 37, as best seen in FIG. 1, includes a cam portion 38 for engaging the end of vent valve control member 23 for controlling the position thereof. The arms 34 and 37 are normally rotatable independently of one another but are connectable to one another by means of a shaft or plunger 39 which is reciprocably positioned by suitable means such as a solenoid 40. The solenoid 40 is mounted on a bracket 41 on shaft 31 and is therefore carried thereby. Thus, when plunger 39 extends through bores 35 and 36 in the respective arms 34 and 37, the arms are connected to rotate together with the cam portion of arms 37 being operative to control the position of the vent valve vent control member 23. The position of the arm 37 and the like is controlled thus by the foot pedal 25 which is normally biased to its fully raised position by means of a spring or the like 42.

SAFETY CONTROL MEANS

Safety control means sometimes termed "deadman control" in the industry, comprises means responsive to the minimum weight on an operator position in the seat of the vehicle for controlling the solenoid 40 which in turn controls the connection of the foot pedal 25 to the creeper control valve member 23. The safety control includes a source of power or current such as a battery 43 which is connected by way of a circuit including a conductor 44, a switch 45, a conductor 46, a pressure responsive or sensitive switch 47 having a plunger 47a, and a conductor 48 to solenoid 40. The solenoid 40 includes a conductor 49 to ground while at the same time the battery 43 includes a conductor 50 to ground.

The solenoid 40 and the plunger is normally spring biased to the outward position. When the circuit is completed such as by closing of switches 45 and 47, the solenoid 40 functions to withdraw plunger 39 from apertures 35 and 36, disconnecting arms 34 and 37 for permitting the vent control member 23 to move outwardly. The switch 45 is preferably a manual type switch and is tied preferably to the ignition switch of the vehicle so that the circuit is activated only when the vehicle ignition is on. The switch 47 is a usual pressure type contact switch wherein pressure biases a pair of contacts apart to break the circuit involving conductors 46 and 48. The switch includes a button or the like 47a, which is depressed by the presence of an operator in the vehicle operator's seat 51. The weight of the operator will bias the seat or a portion thereof downwardly to engage the plunger 47a and depress it with a consequent forcing of the contacts apart for breaking the circuit such that the solenoid 40 is biased by spring means for connecting the two arms 34 and 37 of the creeper control linkage assembly. When these arms are coupled, the spring 42 is effective to bias the vent valve control member 23 into the operative position. Thus, it will be seen that the presence of an operator on seat 51 is essential in order for the vehicle to operate. In the absence of an operator on the seat 51 the circuit is activated with a consequence that solenoid 40 will withdraw plunger 39 from bores 35 and 36, disconnecting the two arms 34 and 37 such that the vent valve control member 23 is automatically biased to its vent position to disable the hydrostatic transmission 22 and thereby prevent translation of the vehicle.

After the two arms 34 and 37 have been disconnected, thereby disconnecting the creeper control pedal from the vent valve control member 23, the pedal must be depressed to align bores 35 and 36 so that the arms 34 and 37 can again be coupled by plunger 39. In order for the plunger 39 to extend outwardly to establish the coupling, the seat 51 must be occupied in order that switch 47 is activated to the circuit braking position to deactivate solenoid 40 to permit it to release plunger 39.

LOCKOUT SYSTEM FOR A SAFETY START

The aforementioned safety system is also tied in with a starter lockout system of the vehicle which is operative to prevent the vehicle from being started when the valve 23 is not in the vent position (outwardly extended) and the plunger 59 of lockout switch 55 is not in the annular slot 60. The starter system for the vehicle includes an electrical starter motor 52 operated by power from battery 43 and includes an ignition or starter switch 53 connected by a suitable conductor to the source of power 43 and by a conductor 54 to a lockout switch 55 which in turn is connected by a conductor 56 to a starter control solenoid 57. The starter solenoid 57 is grounded by suitable ground conductor means 58. The switch 55 includes a plunger 59 which normally rides upon the surface of the vent valve control member 23 when the vehicle is properly in operation and functions in this position to maintain contacts of the switch 55 out of contact so as to interrupt the circuit between conductors 54 and 56. However, when the control member 23 extends or moves outwardly to a position to permit the plunger 59 to ride down into an annular slot or groove 60 formed in the control member 23, the plunger moves outwardly from switch housing 55 closing the contacts of the switch 55, thus allowing energization of the starter circuit. The safety circuit only insures that the vehicle cannot be started with the transmission engaged. The plunger 59 must be in the annular groove to permit cranking. The operator must be on the seat to permit transmission engagement.

BRAKE — CREEPER CONTROL SYSTEM

The aforementioned creeper control system is also interconnected for controlling the brakes of the vehicle. This is such that the vehicle can be slowed or stopped if necessary such as on a steep grade at the same time that the engine is revved to provide fast lift of a load.

The creeper control pedal 25 is connected by a lost motion link of a suitable construction such as a link member 61 having a slot 62 in which a pin 63 on the arm 25a of pedal 25 rides. The opposite end of the link is connected such as by a pin 64 to an arm 65 of a shaft 66 which is mounted in suitable brackets 67. The opposite end of the shaft 66 includes an arm 68 connected by a link 69 to an arm 70 of the vehicle brake pedal 71. The vehicle brake pedal 71 and arm 70 is connected or mounted in suitable bracket means 72 and connected includes an arm 73 connected by a link 74 to operate the brakes of the vehicle.

With this arrangement the creeper pedal 25 is permitted a certain freedom of motion to control the vent valve within the limits of slot 62 before engaging the lower end thereof for engaging the brake control linkage for activating the brakes of the vehicle. Preferably, the adjustment thereof is such that the vehicle will essentially be disabled from translation, in other words, such that transmission 22 is fully disabled prior to full engagement of the brakes. This interconnection of the creeper and brake control permits the operator to control the engine speed or R.P.M. with the right foot on foot pedal 10 while at the same time controlling translation of the vehicle with his left foot on pedal 25. This control system permits the operator to stop the vehicle by means of applying the brakes simultaneously with disabling the transmission 22 with a single control member such that the vehicle could be operated for lifting operations on a steep slope while standing still. Without this arrangement, it would be necessary for the operator to simultaneously depress pedal 25 for creeper control and at the same time depress 71 for brake control either with the same foot or with both feet. If both feet are used then be would be unable to control the speed of the engine by controlling pedal 10.

FIG. 2 of the drawing illustrates further features of the brake system which includes a master cylinder 75 of conventional design to which is connected the brake pedal 71 by means of link 74. The brakes are preferably of conventional hydraulic design and operate in a conventional manner such that depression of the pedal 71 moves a piston within the master cylinder 75 to transmit pressure to brake cylinders at the wheels of the vehicle.

In the control system of the present arrangement, the creeper control pedal 25 which as previously explained is connected to a vent valve in the transmission for overriding the main control of the vehicle transmission to achieve creeping of the vehicle, is also connected as previously described to the brake linkage system. This connection is such as to permit the pedal 25 to fully neutralize the transmission 22 for fully disabling the transmission and thereafter applying the brakes of the vehicle, as best seen in FIG. 1. As seen in FIG. 2, the lost motion linkage including link member 61 having a slot 62 in which rides pin 62 permits this operation.

As also seen in FIG. 2, the lost motion linkage includes adjusting means for adjusting the lost motion in the linkage, or in other words, the permissible motion of the pedal 25 prior to the beginning of application of the brakes.

As seen in FIG. 3, this lost motion linkage adjusting means comprises a bolt or screw 76 having a threaded cylindrical body portion engaging a threaded cylindrical bore 77 formed in the link 61 and extending into the end of the slot 62 for engagement by pin 63. A suitable jamb nut is threadably mounted on the screw or bolt 76 for engagement with the end of link 61 for retaining the bolt or screw in a preselected position. Thus, the downward travel of the pin 63 in slot 62 may be adjusted by means of this bolt or screw arrangement 76. This adjusts the position wherein the pedal 25 brings movement of the link assembly connecting the pedal to the brake cylinder. The relative movement of the pedals and the linkage system is best illustrated in FIGS. 3–6.

In FIG. 2, the creeper pedal 25a is shown in phantom with the pin 63 shown in cross-section disposed within the slot 62 of link 61. Both the creeper pedal 25 and the brake pedal 71 are shown in the neutral position. As illustrated in this position, the pin 63 is disposed approximately midway between the upper and lower limits of its travel within the slot 62. This permits the brake pedal 71 to be depressed to its fully actuated position as shown in FIG. 4 without in any way affecting or interfering with the movement of the creeper pedal 25 which is likewise shown in phantom in FIG. 4.

This construction permits the creeper pedal 25a to be moved downward to its fully effective position as shown in FIG. 5 for fully disabling the transmission 22 prior to engagement of the pin 63 with the lower end of slot 62. After engagement with the adjustable stop means 76 the creeper pedal can be further depressed as shown in FIG. 6 to thereby effect an application of the brakes of the system by means of the creeper pedal 25. The adjustable stop means 76 also permits, if desirable, the adjustment of the system such that the brakes begin to be applied prior to complete bypass or disabling of the transmission or it can be adjusted such that there is total disablement of the transmission prior to any application of the brakes. Other slight modifications or adjustments may also be made as preferred.

From the above description, it is seen that we have provided a novel brake and creeper control system which is operative to control the transmission over a first range of movement and control the brakes over a second range for thereby providing operator control of the transmission and brakes simultaneously by a single pedal. While we have described our invention by means of a single embodiment, it is to be understood that numerous changes and modifications may be made therein without departing from the spirit and scope of the invention as defined in the appended claims.

The embodiments of the invention in which an exclusive property or privilege is claimed are defined as follows:

1. A combined brake and transmission override control system comprising:
   brake actuating linkage;
   a first pedal mounted for pivotal movement about a first axis;
   a second pedal mounted for pivotal movement about a second axis;
   lost motion linkage means for connecting said second pedal to said brake actuating linkage for operation of said brake linkage after a predetermined range of movement of said second pedal, said lost motion linkage means comprising a rotatable shaft mounted for pivotal movement on a third axis, said third axis being radially offset from said first and second axes, said shaft extending between said first and second pedals; and a transmission control element; and, transmission linkage means connecting said second pedal to said transmission control element so that said second pedal operates said transmission element over said predetermined range of movement and operates said brake linkage over a further range of movement after said predetermined range of movement.

2. The control system of claim 1 wherein said transmission linkage means comprises first linkage means connected to move with said second pedal;

second linkage means connected to said transmission control element and connecting means for selectively connecting said first linkage means to said second linkage means.

3. The control system of claim 1 including means for adjusting said predetermined movement of said second pedal.

4. The control system of claim 3 wherein said lost motion linkage means comprises:

a first arm extending from said shaft at said first pedal;

a second arm extending from said shaft at said second pedal;

a first link member connecting said first arm to said first pedal; and a second link member connecting said second arm to said second pedal.

5. The control system of claim 4 wherein:

said second link includes a slot; and a pin extends from said second pedal into said slot and engages said link at one end of said slot upon depression of said pedal for transmitting force from said pedal to said brake actuating linkage.

6. The control system of claim 5 including means for adjusting the point of engagement of said pin with said link comprising a screw threadably mounted in said link and extending along said slot.

7. A combined brake and transmission override control system comprising:

brake actuating linkage;

a first pedal mounted for pivotal movement about a first axis;

a second pedal mounted for pivotal movement about a second axis;

lost motion linkage means for connecting said second pedal to said brake actuating linkage for operation of said brake linkage after a predetermined range of movement of said second pedal, said lost motion linkage means comprising a rotatable shaft mounted for pivotal movement on a third axis, said third axis being radially offset from said first and second axes, said shaft extending between said first and second pedals; and wherein said lost motion linkage means further comprises:

a first arm extending from said shaft at said first pedal;

a second arm extending from said shaft at said second pedal;

a first link member connecting said first arm to said first pedal; and a second link member connecting said second arm to said second pedal;

a transmission control element; and, transmission linkage means for connecting said second pedal to said transmission control element so that said second pedal operates said transmission element over said predetermined range of movement and operates said brake linkage over a further range of movement after said predetermined range of movement.

8. The control system of claim 7 wherein:

said second link includes a slot; and a pin extends from said second pedal into said slot and engages said link at one end of said slot upon depression of said pedal for transmitting force from said pedal to said brake actuating linkage.

9. The control system of claim 8 including means for adjusting the point of engagement of said pin with said link.

10. The control system of claim 9 wherein said means for adjusting said point of engagement comprises a screw threadably mounted in said link and extending along said slot.

* * * * *